(12) United States Patent
Stachowiak

(10) Patent No.: US 6,994,910 B2
(45) Date of Patent: Feb. 7, 2006

(54) HEAT TREATABLE COATED ARTICLE WITH NIOBIUM NITRIDE IR REFLECTING LAYER

(75) Inventor: Grzegorz Stachowiak, Ann Arbor, MI (US)

(73) Assignee: Guardian Industries Corp., Auburn Hills, MI (US)

(*) Notice: Subject to any disclaimer, the term of this patent is extended or adjusted under 35 U.S.C. 154(b) by 284 days.

(21) Appl. No.: 10/338,878

(22) Filed: Jan. 9, 2003

(65) Prior Publication Data

US 2004/0137234 A1 Jul. 15, 2004

(51) Int. Cl.
*B32B 9/00* (2006.01)

(52) U.S. Cl. .................. 428/428; 428/432; 428/433; 428/697; 428/698; 428/699; 428/701; 428/702; 428/704

(58) Field of Classification Search ............... 428/428, 428/432, 433, 697, 698, 699, 701, 702, 704
See application file for complete search history.

(56) References Cited

U.S. PATENT DOCUMENTS

| | | |
|---|---|---|
| 3,597,050 A | 8/1971 | Plumat |
| 5,298,048 A | 3/1994 | Lingle et al. |
| 5,376,455 A | 12/1994 | Hartig et al. |
| 5,395,698 A | 3/1995 | Neuman et al. |
| 5,407,733 A | 4/1995 | Bjornard et al. |
| 5,543,229 A | 8/1996 | Ohsaki et al. |
| 5,552,180 A | 9/1996 | Finley et al. |
| 5,688,585 A | 11/1997 | Lingle et al. |
| 5,837,108 A | 11/1998 | Lingle et al. |
| 5,939,201 A | 8/1999 | Boire et al. |
| 5,948,538 A | 9/1999 | Brochot et al. |
| 6,014,872 A | 1/2000 | Hartig et al. |
| 6,114,043 A | 9/2000 | Joret |
| 6,159,607 A | 12/2000 | Hartig et al. |
| 6,231,999 B1 | 5/2001 | Krisko |
| 6,466,298 B1 | 10/2002 | Fix et al. |
| 6,475,626 B1 | 11/2002 | Stachowiak |
| 6,495,263 B2 | 12/2002 | Stachowiak |
| 6,558,800 B1 | 5/2003 | Stachowiak |
| 6,576,349 B2 | 6/2003 | Lingle et al. |
| 2002/0037421 A1 * | 3/2002 | Amaud et al. ............ 428/472 |
| 2002/0192473 A1 | 12/2002 | Gentilhomme et al. |

FOREIGN PATENT DOCUMENTS

| | | |
|---|---|---|
| JP | 63-206333 | 8/1988 |
| JP | 64-005930 | 1/1989 |
| WO | WO 01/21540 | 3/2001 |
| WO | WO 02/04375 | 1/2002 |
| WO | WO 02/090281 | 11/2002 |
| WO | WO 2004/011382 | 2/2004 |

OTHER PUBLICATIONS

U.S. Appl. No. 10/370,660 filed Feb. 21, 2003.
U.S. Appl. No. 10/423,058 filed Apr. 25, 2003.
U.S. Appl. No. 10/434,470 filed May 9, 2003.
U.S. Appl. No. 10/672,065 filed Sep. 29, 2003.
"Heat Insulating Glass Which Can Be Thermally Worked", Hironobu, 05124839, Oct. 1991.

* cited by examiner

*Primary Examiner*—Deborah Jones
*Assistant Examiner*—G. Blackwell-Rudasill
(74) *Attorney, Agent, or Firm*—Nixon & Vanderhye P.C.

(57) ABSTRACT

A coated article is provided so as to include a solar control coating having an infrared (IR) reflecting layer sandwiched between at least a pair of dielectric layers. The IR reflecting layer includes niobium nitride ($Nb_xN_y$). The use of niobium nitride enables the coated article to have good corrosion resistance to acid(s), good mechanical performance such as scratch resistance, and/or good color stability (i.e., a low $\Delta E^*$ value(s)) upon heat treatment (HT). The coated article may be heat treated (e.g., thermally tempered) in certain example embodiments of the invention.

40 Claims, 3 Drawing Sheets

HEAT TREATABLE COATED ARTICLE WITH NIOBIUM NITRIDE IR REFLECTING LAYER

This invention relates to coated articles that include at least one niobium nitride infrared (IR) reflecting layer sandwiched between at least a pair of dielectric layers, and/or a method of making the same. Such coated articles may be used in the context of monolithic windows, insulating glass (IG) window units, laminated windows, and/or other suitable applications.

BACKGROUND OF THE INVENTION

Solar control coatings having a layer stack of glass/$Si_3N_4$/NiCr/$Si_3N_4$ are known in the art, where the metallic NiCr layer is the sole infrared (IR) reflecting layer in the coating. In certain instances, the NiCr IR reflecting layer may be nitrided.

Unfortunately, while such layer stacks provide efficient solar control and are overall good coatings, they sometimes are lacking in terms of: (a) corrosion resistance to acid (e.g., HCl boil); (b) mechanical performance such as scratch resistance; and/or (c) thermal stability upon heat treatment for tempering, heat bending, or the like (i.e., $\Delta E^*$ value(s)). For example, a known heat treatable coated article having a layer stack of glass/$Si_3N_4$/NiCr/$Si_3N_4$ has an undesirably high glass side reflective $\Delta E^*$ value of above 5.0 after heat treatment (HT) at 625 degrees C. for ten minutes. This high glass side reflective $\Delta E^*$ value means that the coated article when HT will not approximately match its non-HT counterpart with respect to glass side reflective color.

Accordingly, there exists a need in the art for a coated article that has improved characteristics with respect to (a), (b) and/or (c) compared to a conventional layer stack of glass/$Si_3N_4$/NiCr/$Si_3N_4$, but which still is capable of acceptable solar control (e.g., blocking a reasonable amount of IR and/or UV radiation) and/or heat treatment. It is a purpose of this invention to fulfill at least one of the above-listed needs, and/or other needs which will become apparent to the skilled artisan once given the following disclosure.

SUMMARY OF THE INVENTION

In certain example embodiments of this invention, a coating or layer system is provided which includes an infrared (IR) reflecting layer comprising niobium nitride sandwiched between at least a pair of dielectric layers. In certain example embodiments, the coating or layer system has good corrosion resistance to acid(s) such as HCl, good mechanical performance such as scratch resistance, and/or good color stability (i.e., a low $\Delta E^*$ value(s)) upon heat treatment (HT).

Due to its spectral selectivity, niobium nitride provides thermal performance (e.g., IR blocking) similar to NiCr, but is surprisingly more chemically and/or mechanically durable than NiCr. The use of niobium nitride as an IR reflecting layer results in a solar control coating having excellent scratch resistance, and its resistance to acids such as HCl is exceptional. Its resistance to alkaline solutions is also good. Moreover, it has surprisingly been found that the use of niobium nitride as an IR reflecting layer enables a solar control coating to have significantly improved thermal stability upon HT (e.g., a lower $\Delta E^*$ value with a given HT time) than the aforesaid conventional coating where metallic NiCr is used as the IR reflecting layer.

A coated article according to an example embodiment of this invention utilizes such a niobium nitride layer sandwiched between a pair of silicon nitride dielectric layers.

Coated articles according to certain embodiments of this invention may be used as monolithic windows due to their excellent durability characteristics, which may or may not be heat treated. Alternatively, coated articles according to this invention may also be used in the context of insulating glass (IG) window units, or in other suitable application, which may or may not involve heat treatment.

In certain example embodiments of this invention, heat treated (HT) coated articles including a niobium nitride IR reflecting layer have a glass side reflective $\Delta E^*$ value of no greater than 3.0, more preferably no greater than 2.5, even more preferably no greater than 2.0, and most preferably no greater than 1.8. For purposes of example, the heat treatment (HT) may be for at least about 5 minutes at a temperature(s) of at least about 580 degrees C.

In certain example embodiments of this invention, the niobium nitride IR reflecting layer may be represented by $Nb_xN_y$, where the y/x ratio is from 0.3 to 0.9, even more preferably from 0.4 to 0.8, still more preferably from 0.5 to 0.7, and most preferably from 0.55 to 0.65. For purposes of example only, $Nb_5N_3$ translates into a y/x ratio of 3/5 (i.e., 0.6). It has surprisingly been found that these particular y/x ratio range(s) for nitrides of niobium (Nb) are particularly beneficial with respect to coating characteristics such as spectral curves and/or chemical resistance. For instance, nitriding of Nb in amounts greater than this may result in less chemical resistance.

Generally speaking, certain example embodiments of this invention fulfill one or more of the above listed needs by providing a heat treated coated article including a layer system supported by a glass substrate, the layer system comprising: a first layer comprising silicon nitride; a layer comprising niobium nitride provided on the glass substrate over the first layer comprising silicon nitride; a second layer comprising silicon nitride provided on the glass substrate over the layer comprising niobium nitride; wherein the layer comprising niobium nitride is sandwiched between and contacts each of the first and second layers comprising silicon nitride; and wherein the coated article has a $\Delta E^*$ value (glass side reflective) of no greater than 3.0 after and/or due to heat treatment.

In certain other example embodiments of this invention, one or more of the above-listed needs is/are fulfilled by providing a heat treatable coated article including a coating supported by a glass substrate, the coating comprising: a first dielectric layer; a layer comprising niobium nitride; a second dielectric layer; and wherein layers of the coated article are of respective thicknesses and materials so that if subjected to heat treatment for at least about 5 minutes at temperature(s) of at least about 580 degrees C. the coated article would have a $\Delta E^*$ value (glass side reflective) of no greater than 3.0.

In certain other example embodiments of this invention, one or more of the above-listed needs is/are fulfilled by providing a coated article including a layer system supported by a glass substrate, the layer system comprising: a first dielectric layer; a layer comprising niobium nitride $Nb_xN_y$ provided on the glass substrate over the first dielectric layer, where a ratio y/x of N to Nb in the layer comprising niobium nitride is from 0.3 to 0.9; and a second dielectric layer provided on the glass substrate over the layer comprising niobium nitride.

In certain other example embodiments of this invention, one or more of the above-listed needs is/are fulfilled by providing a method of making a coated article, the method comprising: sputtering a first dielectric layer on a substrate; sputtering a layer comprising niobium nitride on the substrate over the first dielectric layer; sputtering a second dielectric layer on the substrate over the layer comprising niobium nitride; and wherein the layer comprising niobium nitride is sputtered so as to form $Nb_xN_y$ where y/x is from 0.3 to 0.9.

IN THE DRAWINGS

Figure 4:
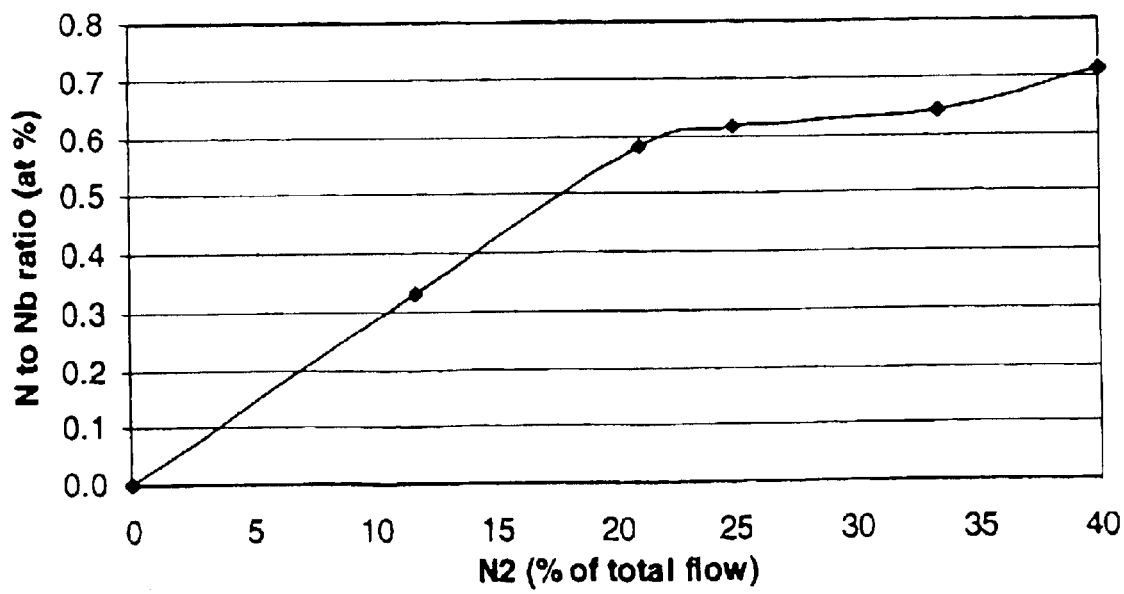

FIG. 4 is a graph plotting nitrogen gas flow as a percentage of total gas flow during sputtering of a niobium nitride layer vs. the resulting ratio y/x (given $Nb_xN_y$) in the resulting niobium nitride layer according to different embodiments of this invention, thereby illustrating different stoichiometries of the layer as a function of the amount of nitrogen in the total sputtering gas flow (N and Nb atomic percentages were determined using XPS).

Figure 5:
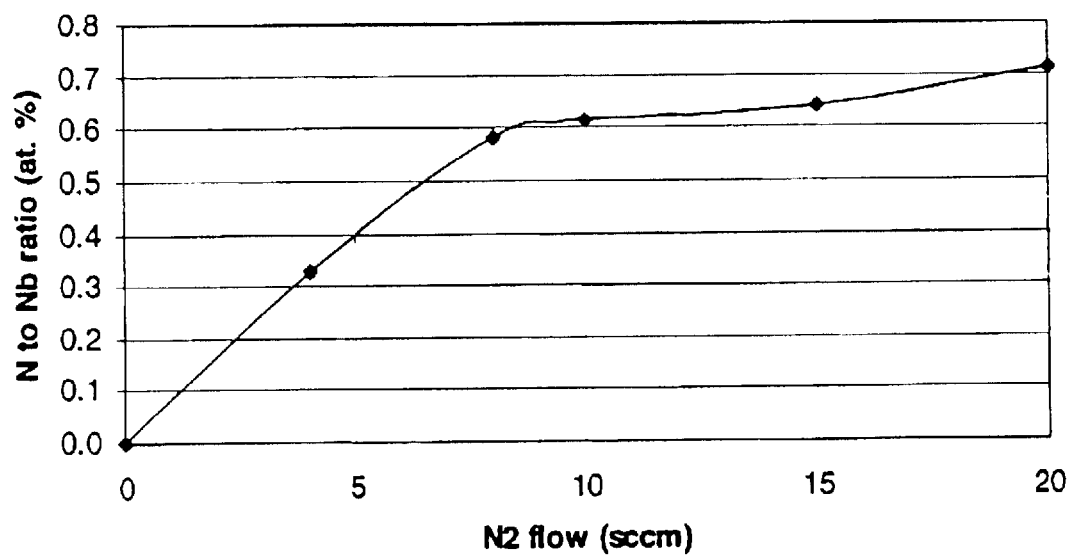

FIG. 5 is a graph plotting nitrogen gas flow (in units of sccm) during sputtering of a niobium nitride layer vs. the resulting ratio y/x (given $Nb_xN_y$) in the resulting niobium nitride layer according to different embodiments of this invention, thereby illustrating different stoichiometries of the layer as a function of nitrogen gas flow during sputtering (N and Nb atomic percentages were determined using XPS).

DETAILED DESCRIPTION OF CERTAIN EXAMPLE EMBODIMENTS OF THE INVENTION

Certain embodiments of this invention provide a coating or layer system that may be used in windows such as monolithic windows (e.g., vehicle, residential, or architectural windows), IG window units, and/or other suitable applications. Certain example embodiments of this invention provide a layer system that is characterized by good (a) corrosion resistance to acid (e.g., which can be tested via an HCl boil); (b) mechanical performance such as scratch resistance; and/or (c) thermal stability upon heat treatment. With respect to thermal stability upon heat treatment (HT), this means a low value of $\Delta E^*$; where $\Delta$ is indicative of change in view of HT such as thermal tempering, heat bending, or thermal heat strengthening, monolithically and/or in the context of dual pane environments such as IG units or laminates. Such heat treatments sometimes necessitate heating the coated substrate to temperatures from about 580° C. up to about 800° C. for 5 minutes or more.

Figure 1:
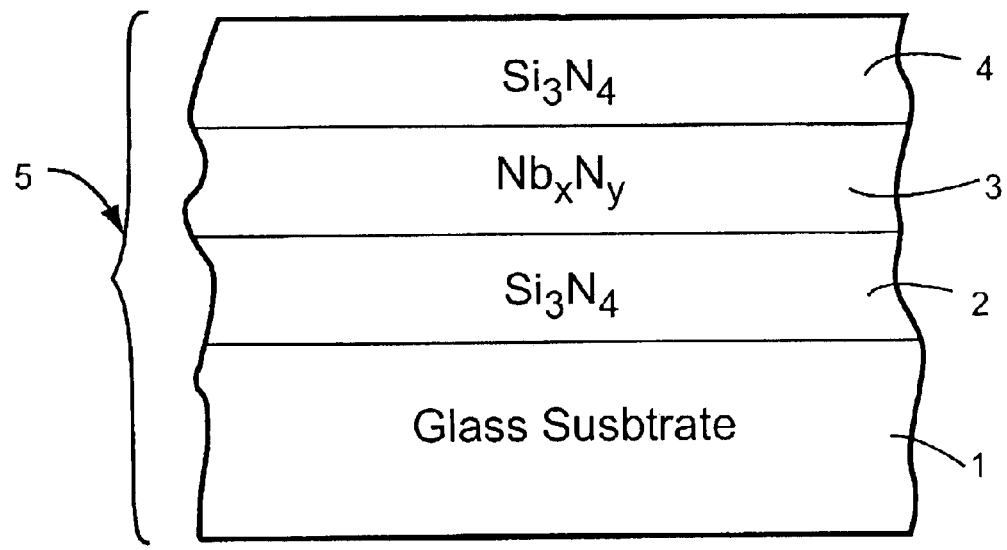
FIG. 1 is a partial cross sectional view of an embodiment of a monolithic coated article (heat treated or not heat treated) according to an example embodiment of this invention.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first dielectric layer 2 (e.g., of or including silicon nitride (e.g., $Si_3N_4$), tin oxide, or some other suitable dielectric), infrared (IR) reflecting layer 3 of or including niobium nitride ($Nb_xN_y$), and second dielectric layer 4 (e.g., of or including silicon nitride (e.g., $Si_3N_4$), tin oxide, or some other suitable dielectric. In certain example embodiments of this invention, coating 5 does not include any metallic IR reflecting layer such as Ag or Au. In such embodiments, niobium nitride IR reflecting layer 3 may be the only IR reflecting layer in coating 5. In certain example embodiments of this invention, niobium nitride IR reflecting layer 3 does not contact any metal IR reflecting layer.

Overall coating 5 includes at least layers 2–4. It is noted that the terms "oxide" and "nitride" as used herein include various stoichiometries. For example, the term silicon nitride includes stoichiometric $Si_3N_4$, as well as non-stoichiometric silicon nitride such as Si-rich silicon nitride. Layers 2–4 may be deposited on substrate 1 via magnetron sputtering, or via any other suitable technique in different embodiments of this invention.

In certain example embodiments of this invention, IR reflecting layer 3 is sputter-deposited as niobium nitride. The stoichiometry of this layer as deposited may be represented, in certain example embodiments, by $Nb_xN_y$ where the ratio y/x (i.e., the ratio of N to Nb) is from 0.3 to 0.9, even more preferably from 0.4 to 0.8, still more preferably from 0.5 to 0.7, and most preferably from 0.55 to 0.65. For purposes of example only, niobium nitride in the form of $Nb_5N_3$ translates into a y/x ratio of 3/5 (i.e., 0.6). It has surprisingly been found that the aforesaid y/x ratio ranges for nitrides of niobium are particularly beneficial with respect to coating characteristics such as spectral curves and/or chemical resistance. For instances, nitriding of Nb in amounts greater than this may result in less chemical resistance of coating 5. In other words, if the y/x ratio is greater than the aforesaid range(s), chemical durability degrades. Also, if the y/x ratio is less than the aforesaid range(s), solar performance suffers in that not as much IR is blocked (reflected and/or absorbed) by the coating.

While FIG. 1 illustrates coating 5 in a manner where $Nb_xN_y$ layer 3 is in direct contact with dielectric layers 2 and 4, and wherein $Nb_xN_y$ layer 3 is the only IR reflecting layer in the coating, the instant invention is not so limited. Other layer(s) may be provided between layers 2 and 3 (and/or between layers 3 and 4) in certain other embodiments of this invention. Moreover, other layer(s) may be provided between substrate 1 and layer 2 in certain embodiments of this invention; and/or other layer(s) may be provided on substrate 1 over layer 4 in certain embodiments of this invention. Thus, while the coating 5 or layers thereof is/are "on" or "supported by" substrate 1 (directly or indirectly), other layer(s) may be provided therebetween. Thus, for example, the layer system 5 and layers thereof shown in FIG. 1 are considered "on" the substrate 1 even when other layer(s) may be provided therebetween (i.e., the terms "on" and "supported by" as used herein are not limited to directly contacting).

Surprisingly, it has been found that the use of $Nb_xN_y$ in layer 3 (as opposed to only NiCr) results in a coated article having: (a) improved corrosion resistance with respect to acid such as HCl; (b) improved mechanical performance such as better scratch resistance; and/or (c) improved thermal stability (i.e., lower $\Delta E^*$ value(s)) in the context of a heat treatable coating.

In certain example embodiments of this invention, dielectric anti-reflection layers 2 and/or 4 each may have an index of refraction "n" of from about 1.5 to 2.5, more preferably from 1.9 to 2.3. Meanwhile, layer 3 may have an index "n" of from about 2.0 to 2.4, more preferably from about 2.17 to 2.3 in certain example embodiments of this invention. The anti-reflection function of the dielectric(s) is associated with the complex refractive index (n+ik). The difference in complex index (k in the case of silicon nitride is about 0.01 or lower, while k for niobium nitride layer is about 2.5 to 3.1 at 550 nm) enables antireflection to be achieved in certain example embodiments of this invention. Increased transmittance results partially from reduced reflection and partially from reduced absorption. In embodiments of this invention where layers 2 and/or 4 comprise silicon nitride (e.g., $Si_3N_4$), sputtering targets including Si employed to form these layers may or may not be admixed with up to 6–20% by weight aluminum or stainless steel (e.g. SS#316), with about this amount then appearing in the layers so formed.

Figure 2:
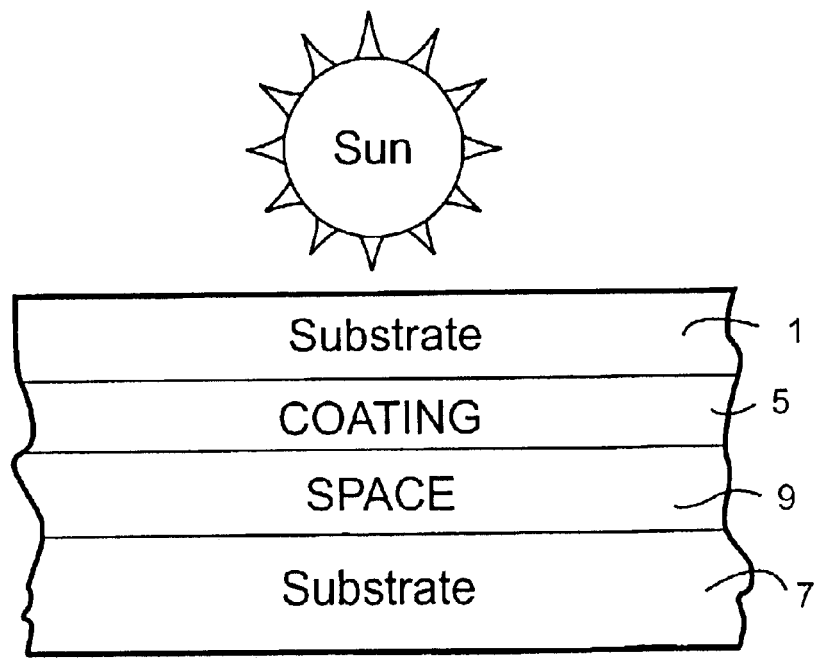
FIG. 2 is a partial cross-sectional view of an IG window unit as contemplated by this invention, in which the coating or layer system of FIG. 1 may be used.

While FIG. 1 illustrates a coated article according to an embodiment of this invention in monolithic form, FIG. 2 illustrates the coating or layer system 5 of FIG. 1 being utilized on surface #2 of an IG (insulating glass) window unit. In FIG. 2, the two glass substrates (e.g., float glass 2 mm to 12 mm thick) 1, 7 are sealed at their peripheral edges by a conventional sealant and/or spacer (not shown) and may be provided with a conventional desiccant strip (not shown). The panes are then retained in a conventional window or door retaining frame. By sealing the peripheral edges of the glass sheets and replacing the air in insulating space (or chamber) 9 with a gas such as argon, a high insulating value IG unit is formed as illustrated in FIG. 2. Optionally, insulating space 9 may be at a pressure less than atmospheric pressure in certain alternative embodiments, although this of course is not necessary in all IG embodiments. In IG embodiments, coating 5 from FIG. 1 may be provided on the inner wall of substrate 1 in certain embodiments of this invention (as in FIG. 2), and/or on the inner wall of substrate 7 in other embodiments of this invention.

Turning back to FIG. 1, while various thicknesses may be used consistent with one or more of the objects and/or needs discussed herein. According to certain non-limiting example embodiments of this invention, example thicknesses and materials for the respective layers on the glass substrate 1 are as follows:

TABLE 1

(Example non-limiting thicknesses)

| Layer | Example Range (Å) | Preferred (Å) | Best (Å) |
|---|---|---|---|
| silicon nitride (layer 2): | 10–1,000 Å | 20–900 Å | 30–850 Å |
| $Nb_xN_y$ (layer 3): | 50–700 Å | 100–500 Å | 150–350 Å |
| silicon nitride (layer 4): | 100–900 Å | 150–800 Å | 200–500 Å |

In certain exemplary embodiments, the color stability with lengthy HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same. Stated yet another way, the coated article has good color stability upon HT.

The value(s) $\Delta E^*$ is important in determining whether or not there is matchability, or substantial color matchability upon HT, in the context of certain embodiments of this invention (i.e., the term $\Delta E^*$ is important in determining color stability upon HT). Color herein is described by reference to the conventional $a^*, b^*$ values. For example, the term $\Delta a^*$ is indicative of how much color value $a^*$ changes due to HT.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. (John Wiley & Sons, 1987). As used in the art, $\Delta E^*$ (and $\Delta E$) is a way of adequately expressing the change (or lack thereof) in reflectance and/or transmittance (and thus color appearance, as well) in an article after or due to HT. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein:

$L^*$ is (CIE 1976) lightness units
$a^*$ is (CIE 1976) red-green units
$b^*$ is (CIE 1976) yellow-blue units and the distance $\Delta E^*$ between $L^*_o a^*_o b^*_o$ and $L^*_1 a^*_1 b^*_1$ is:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (or coated article) after heat treatment; and the numbers employed (e.g., $a^*$, $b^*$, $L^*$) are those calculated by the aforesaid (CIE LAB 1976) $L^*$, $a^*$, $b^*$ coordinate technique. In a similar manner, $\Delta E$ may be calculated using equation (1) by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

After heat treatment (HT) such as thermal tempering, in certain example embodiments of this invention coated articles have color characteristics as follows in Table 2. It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) (not shown in Table 2) means reflective color when viewed from the side of the coated article on which the coating 5 is provided.

TABLE 2

| Color/Optical Characteristics due to/after Heat Treatment | | | |
|---|---|---|---|
| | General | Preferred | Most Preferred |
| $\Delta E^*_G$ | <=3.0 | <=2.5 | <=2.0 |
| $\Delta E^*_T$ | <=5.0 | <=2.5 | <=2.0 |
| $a^*_G$ | −6 to +6 | −4 to +4 | −3 to +3 |
| $b^*_G$ | −30 to +25 | −25 to +20 | −20 to +10 |
| $\Delta a^*_G$ | <=1.6 | <=1.0 | <=0.8 |
| $\Delta b^*_G$ | <=1.5 | <=1.0 | <=0.6 |
| $\Delta L^*_G$ | <=5 | <=3 | <=2 |
| $T_{vis}$ (TY): | 8–80% | 10–50% | 10–30% |
| $R_s$ (Ω/sq): | <250 | <150 | <110 |

Coated articles herein may even have a glass side reflective $\Delta E^*$ value ($\Delta E^*_G$) of no greater than 1.8 in certain example embodiments of this invention.

Figure 3:
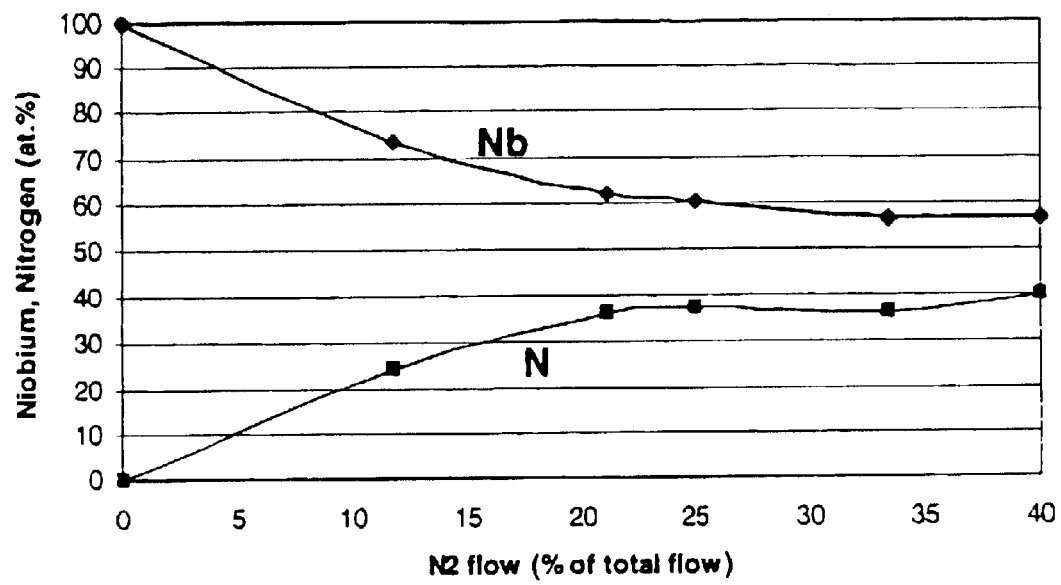
FIG. 3 is a graph plotting nitrogen gas flow (during sputtering of a niobium nitride layer) vs. Nb, N atomic content in the resulting layer, illustrating stoichiometry of niobium nitride layers according to different embodiments of this invention as a function of nitrogen gas flow during sputtering (N and Nb atomic percentages were determined using XPS).

FIGS. 3–5 illustrate various stoichiometries of niobium nitride layer 3 according to different embodiments of this invention. In particular, these figures illustrate various ratios of N to Nb in the niobium nitride layer 3 as a function of nitrogen gas flow during the sputtering process in which the layer 3 is sputter-deposited. In these figures, the N and Nb atomic percentages (at. %) were determined using XPS. Additionally, it is noted that the correlation between nitrogen gas flows and the N to Nb ratio(s) was determined in accordance with the ILS coater used to deposit these samples since the flows were measured in this sputter coater. FIG. 3 is a graph plotting nitrogen gas flow (during sputtering of a niobium nitride layer) vs. Nb, N atomic content in the resulting layer, illustrating stoichiometry of niobium nitride layers according to different embodiments of this invention as a function of nitrogen gas flow during sputtering. FIG. 4 is a graph plotting nitrogen gas flow as a percentage of total gas flow during sputtering of a niobium nitride layer vs. the resulting ratio y/x (given $Nb_xN_y$) in the resulting niobium nitride layer according to different embodiments of this invention, thereby illustrating different stoichiometries of the layer as a function of the amount of nitrogen in the total sputtering gas flow. FIG. 5 is a graph plotting nitrogen gas flow (in units of sccm) during sputtering of a niobium nitride layer vs. the resulting ratio y/x (given $Nb_xN_y$) in the resulting niobium nitride layer according to different embodiments of this invention, thereby illustrating different stoichiometries of the layer as a function of nitrogen gas flow during sputtering. As explained above, the best performance (balancing durability and solar performance) occurs when the $Nb_xN_y$ layer 3 is characterized by a N to Nb ratio y/x of from 0.3 to 0.9, even more preferably from 0.4 to 0.8, still more preferably from 0.5 to 0.7, and most preferably from 0.55 to 0.65.

For purposes of example only, a plurality of examples representing different example embodiments of this invention are set forth below.

EXAMPLES

The following two monolithic Example coated articles (each ultimately annealed and heat treated) were made. The $Si_3N_4$ layers 2 and 4 in each example were deposited by sputtering a silicon target (doped with Al) in an atmosphere including nitrogen gas. The niobium nitride layer 3 in each example was deposited by sputtering in an atmosphere including argon and nitrogen gas.

For Example 1, the following sputtering process parameters were used in depositing the coating. Line speed is in inches per minute (IPM):

TABLE 3

Example 1 Coating Process Parameters

| Layer | Power | Voltage | Line Speed | # Passes | Ar flow | N flow |
|---|---|---|---|---|---|---|
| SiN layer 2: | 2.5 kW | 486 V | 49.5 | 8 | 40 | 55 |
| $Nb_xN_y$ layer 3: | 1.0 kW | 426 V | 33 | 3 | 30 | 12 |
| SiN layer 4: | 2.5 kW | 482 V | 49.5 | 3 | 40 | 55 |

For Example 2, the following sputtering process parameters were used in depositing the coating. Again, line speed is in inches per minute (IPM):

TABLE 4

Example 2 Coating Process Parameters

| Layer | Power | Voltage | Line Speed | # Passes | Ar flow | N flow |
|---|---|---|---|---|---|---|
| SiN layer 2: | 1.0 kW | 453 V | 41.2 | 1 | 40 | 55 |
| $Nb_xN_y$ layer 3: | 1.0 kW | 432 V | 36.3 | 3 | 30 | 12 |
| SiN layer 4: | 1.0 kW | 448 V | 41.2 | 6 | 40 | 55 |

After being sputtered, Examples 1–2 had the following characteristics after being sputtered (annealed and non-HT) (Ill. C, 2 degree observer):

TABLE 5

Characteristics (non- HT)

| Parameter | Ex. 1 | Ex. 2 |
|---|---|---|
| $T_{vis}$ (TY) (transmissive): | 19.6% | 19.7% |
| $a^*_T$ | -2.4 | -1.4 |
| $b^*_T$ | -3.4 | -8.3 |
| $L^*_T$ | 51.4 | 51.5 |
| $R_GY$ (glass side refl. %): | 20.3% | 31.8% |
| $a^*_G$: | 0.8 | -1.3 |
| $b^*_G$: | -14.5 | -0.9 |
| $L^*_G$: | 52.2 | 63.2 |
| $R_FY$ (film side refl. %): | 28.9% | 23.0% |
| $a^*_F$: | 1.4 | 1.8 |
| $b^*_F$: | 34.4 | 25.6 |
| $L^*_F$: | 60.7 | 55.1 |
| $T_{sol}$ (TS): | 14% | 14% |
| Shading Coefficient (SC): | 0.37 | 0.34 |
| SHGC: | 0.32 | 0.30 |
| $T_{uv}$ (UV transmission): | 15% | 19.2% |
| $R_s$ (sheet resistance; ohms/sq.): | 97.7 | 103 |

Each of Examples 1 and 2 has a layer stack as follows, set forth in Table 6. The thicknesses and stoichiometries listed below in Table 6 for the Examples are approximations and are not exact. The coating 5 for each Example is shown in FIG. 1, and thus includes layers 2, 3 and 4. The glass substrates were clear and about 6 mm thick in each Example.

TABLE 6

Coatings in Examples

| Example 1: | Glass/$Si_3N_4$(800 Å)/$Nb_xN_y$(254 Å)/$Si_3N_4$(300 Å) |
|---|---|
| Example 2: | Glass/$Si_3N_4$(50 Å)/$Nb_xN_y$(231 Å)/$Si_3N_4$(300 Å) |

After being sputter coated, each of Examples 1 and 2 was then heat treated for 10 minutes at about 625 degrees C. Table 7 below sets forth certain thermal stability characteristics of Examples 1–2 upon/after heat treatment (HT).

TABLE 7

Glass Side Refl. Thermal Stability Upon HT

| Parameter | Ex. 1 | Ex. 2 |
|---|---|---|
| $\Delta E^*_G$: | 1.7 | 1.4 |

As can be seen from Table 7, all Examples were characterized by excellent glass side reflective $\Delta E^*$ values. The low numbers associated with these values illustrate how little the optical characteristics of the coating changed upon the heat treatment. This is indicative of superior thermal stability upon heat treatment (e.g., thermal tempering or the like).

For purposes of comparison, consider the following layer stack: glass/$Si_3N_4$/NiCr/$Si_3N_4$, which has a glass side reflective $\Delta E^*$ value of above 5.0 after heat treatment (HT) at 625 degrees C. for ten minutes. The Examples 1–2 above clearly illustrate the comparative advantage of using niobium nitride, as opposed to NiCr, for the IR reflecting layer. A much lower glass side reflective $\Delta E^*$ value is achievable using niobium nitride. Moreover, durability may also be improved as explained above.

Accordingly, advantages associated with the use of niobium nitride as a IR reflecting layer include (a) improved corrosion resistance with respect to acid such as HCl; (b) improved mechanical performance such as better scratch resistance; and/or (c) improved thermal stability (i.e., lower $\Delta E^*$ value(s)). In certain embodiments of this invention, coated articles may or may not be heat treated.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the terms visible light transmittance (TY), infrared radiation transmittance, and ultraviolet radiation transmittance ($T_{uv}$) are known in the art. Total solar energy transmittance (TS) is then usually characterized as a weighted average of these values from 300 to 2500 nm (UV, visible and near IR). With respect to these transmittances, visible transmittance (TY), as reported herein, is characterized by the standard CIE Illuminant C, 2 degree observer, technique at 380–720 nm; near-infrared is 720–2500 nm; ultraviolet is 300–800 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". For example, chemical durability may be determined by boiling a sample of a coated glass substrate in about 500 cc of 5% HCl for one hour (i.e. at about 195° F.). Alternatively, chemical durability may be determined by an NaOH boil which includes boiling a sample of a coated glass substrate in a solution having a pH of about 12.2 that is a mixture of water and NaOH (about 0.4% NaOH); the solution is available from LabChem, Inc., Cat. No. LC 24270-4 (this is what is meant by NaOH boil herein). The NaOH boil may be carried out at a temperature of about 145 degrees F. (Examples above), or about 195 degrees F. in other instances.

The terms "heat treatment" and "heat treating" as used herein mean heating the article to a temperature sufficient to enabling thermal tempering, bending, and/or heat strengthening of the glass inclusive article. This definition includes, for example, heating a coated article to a temperature of at least about 580 degrees C. for a sufficient period to enable tempering. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A heat treated coated article including a layer system supported by a glass substrate, the layer system comprising:
   a first layer comprising silicon nitride;
   a layer comprising niobium nitride provided on the glass substrate over the first layer comprising silicon nitride;
   a second layer comprising silicon nitride provided on the glass substrate over the layer comprising niobium nitride;
   wherein the layer comprising niobium nitride is sandwiched between and contacts each of the first and second layers comprising silicon nitride;
   wherein the coated article has a $\Delta E^*$ value (glass side reflective) of no greater than 3.0 after and/or due to heat treatment; and wherein the layer comprising niobium nitride is represented by $Nb_xN_y$, where a ratio y/x of N to Nb is from 0.3 to 0.9.

2. The coated article of claim 1, wherein the coated article has a visible transmission of from 8 to 80%.

3. The coated article of claim 1, wherein at least one of the layers comprising silicon nitride further includes at least one of stainless steel, aluminum, and oxygen.

4. The coated article of claim 1, wherein the coated article has a $\Delta E^*$ value (glass side reflective) of no greater than 2.5 after and/or due to heat treatment.

5. The coated article of claim 1, wherein the coated article has a $\Delta E^*$ value (glass side reflective) of no greater than 2.0 after and/or due to heat treatment, and wherein the heat treatment is for at least about 5 minutes at a temperature(s) of at least about 580 degrees C.

6. The coated article of claim 1, wherein the coated article has a $\Delta E^*$ value (glass side reflective) of no greater than 1.8 after and/or due to heat treatment.

7. The coated article of claim 1, wherein the ratio y/x is from 0.4 to 0.8.

8. The coated article of claim 1, wherein the ratio y/x is from 0.5 to 0.7.

9. The coated article of claim 1, wherein the ratio y/x is from 0.55 to 0.65.

10. The coated article of claim 1, wherein the layer system consists essentially of the first and second layers comprising silicon nitride and the layer comprising niobium nitride.

11. The coated article of claim 1, wherein the coated article has no metallic infrared (IR) reflecting layer.

12. The coated article of claim 1, wherein the layer comprising niobium nitride does not contact any metal layer.

13. The coated article of claim 1, wherein the layer comprising niobium nitride is formed so that it is nitrided as deposited.

14. The coated article of claim 1, wherein the coated article is an IG window unit, a monolithic window, or a laminated window.

15. The coated article of claim 1, wherein the heat treatment is for at least about 5 minutes at a temperature(s) of at least about 580 degrees C.

16. A heat treated coated article including a layer system supported by a glass substrate, the layer system comprising:
 a first layer comprising silicon nitride;
 a layer comprising niobium nitride provided on the glass substrate over the first layer comprising silicon nitride;
 a second layer comprising silicon nitride provided on the glass substrate over the layer comprising niobium nitride;
 wherein the coated article has a $\Delta E^*$ value (glass side reflective) of no greater than 3.0 after and/or due to heat treatment; and
 wherein the layer comprising niobium nitride is represented by $Nb_xN_y$, where a ratio y/x of N to Nb is from 0.3 to 0.9.

17. The coated article of claim 16, wherein the coated article has a visible transmission of from 8 to 80%.

18. The coated article of claim 16, wherein the coated article has a $\Delta E^*$ value (glass side reflective) of no greater than 2.5 after and/or due to heat treatment.

19. The coated article of claim 16, wherein the coated article has a $\Delta E^*$ value (glass side reflective) of no greater than 2.0 after and/or due to heat treatment, and wherein the heat treatment is for at least about 5 minutes at a temperature(s) of at least about 580 degrees C.

20. The coated article of claim 16, wherein the ratio y/x is from 0.4 to 0.8.

21. The coated article of claim 16, wherein the ratio y/x is from 0.5 to 0.7.

22. The coated article of claim 16, wherein the coated article has no metallic infrared (IR) reflecting layer.

23. The coated article of claim 16, wherein the layer comprising niobium nitride does not contact any metal layer.

24. A coated article including a layer system supported by a glass substrate, the layer system comprising:
 a first dielectric layer;
 a layer comprising niobium nitride $Nb_xN_y$ provided on the glass substrate over the first dielectric layer, where a ratio y/x of N to Nb in the layer comprising niobium nitride is from 0.3 to 0.9; and
 a second dielectric layer provided on the glass substrate over the layer comprising niobium nitride.

25. The coated article of claim 24, wherein the coated article has a visible transmission of from 8 to 80%.

26. The coated article of claim 24, wherein the coated article is thermally tempered and has a $\Delta E^*$ value (glass side reflective) of no greater than 2.5 after and/or due to heat treatment.

27. The coated article of claim 24, wherein the layer comprising niobium nitride is in direct contact with each of the first and second dielectric layers.

28. The coated article of claim 24, wherein the coated article does not include any metallic layer.

29. The coated article of claim 24, wherein the coated article is heat treated and has a $\Delta E^*$ value (glass side reflective) of no greater than 2.0 after and/or due to heat treatment.

30. The coated article of claim 24, wherein at least one of the first and second dielectric layers comprises silicon nitride.

31. The coated article of claim 24, wherein the ratio y/x is from 0.4 to 0.8.

32. The coated article of claim 24, wherein the ratio y/x is from 0.5 to 0.7.

33. The coated article of claim 24, wherein the coated article is heat treatable, and if subjected to heat treatment for 10 minutes at 625 degrees C. would have a $\Delta E^*$ value (glass side reflective) of no greater than 3.0 after and/or due to heat treatment.

34. The coated article of claim 24, wherein the coated article is heat treatable, and if subjected to heat treatment for at least about 5 minutes at temperature(s) of at least about 580 degrees C. would have a $\Delta E^*$ value (glass side reflective) of no greater than 2.0 after and/or due to heat treatment.

35. The coated article of claim 24, wherein layers of the coated article are of respective thicknesses and materials so that if subjected to heat treatment for 10 minutes at 625 degrees C. the coated article would have a $\Delta E^*$ value (glass side reflective) of no greater than 3.0.

36. The coated article of claim 24, wherein the coated article does not include any IR reflecting layer comprising silver or gold.

37. A coated article including a layer system supported by a substrate, the layer system comprising:
 a layer comprising niobium nitride $Nb_xN_y$ provided on the substrate, where a ratio y/x of N to Nb in the layer comprising niobium nitride is from 0.3 to 0.9; and
 at least one layer provided on the substrate over the layer comprising niobium nitride.

38. The coated article of claim 37, wherein the coated article has a visible transmission of from 8 to 80%.

39. The coated article of claim 37, wherein the coated article is thermally tempered and has a $\Delta E^*$ value of no greater than 2.5 after and/or due to heat treatment.

40. The coated article of claim 37, wherein a dielectric layer is provided between the layer comprising niobium nitride and the substrate.

* * * * *